Patented July 20, 1948

2,445,733

UNITED STATES PATENT OFFICE 2,445,733

RESINS FROM METHYLENE DIOXOLANES

Milton R. Radcliffe, Glen Rock, N. J., and William G. Mayes, Cuyahoga Falls, Ohio, assignors to The Firestone Tire & Rubber Company, Akron, Ohio, a corporation of Ohio No Drawing. Application July 21, 1945, Serial No. 606,470

4 Claims. (Cl. 260—84)

This invention relates to resinous polymers and copolymers of methylene dioxolanes having the formula (I) 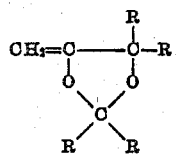

in which formula "R," independently in each occurrence, represents hydrogen or an organic radical.

Compounds of the type of Formula I have heretofore been prepared (Berichte, 63B, 1732–44) and are prospectively cheap and readily available, their synthesis involving the condensation of (A) glycerine or various three- or higher-carbon petroleum and coal tar derivatives with (B) aldehydes or ketones. However, so far as the applicants (patentees) are aware, no practical use has heretofore been found for these compounds; specifically, prior to the applicants' invention, it has not been proposed to prepare resinous polymers from these compounds due, no doubt, to their side-chain methylene configuration, which is quite dissimilar to that of the conventional vinyl monomers. The applicants, however, have discovered that compounds of the type of Formula I may be polymerized, either alone or in admixture with other unsaturated polymerizable compounds, to yield resins having a wide range of properties useful as molding resins, coatings, filaments, and for many other purposes. These polymers and copolymers are formed by unsaturated addition type reactions involving the 4-methylene side chain, analogous to vinyl and conjugated diene polymerization.

The 4-methylene dioxolanes upon which the resins of this invention are based may be any compounds having the formula

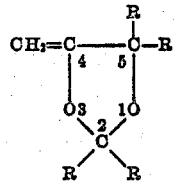

wherein "R" represents hydrogen or an organic radical. Thus "R" may represent hydrogen; an alkyl group such as a methyl, ethyl, propyl, or butyl group; an aryl or aralkyl radical such as phenyl, benzyl, tolyl, etc.; and various radicals containing atoms other than carbon and hydrogen such as alkoxy, carboxylic and alkylol groups such as the methoxy methyl, acetic acid, hydroxy ethyl, etc. groups. It is understood, of course, that the radicals denoted "R" in any suitable compound may all be the same, or they may vary from position to position in the dioxolane; for instance, one of the radicals denoted by "R" at the 5-position may be a methyl group, and the other radical "R" at the 5-position may be hydrogen; one radical attached at the 2-position may be a methyl group and the other radical "R" at the 2-position an ethyl group and so on. It is likewise to be understood that, in some cases, two of the substitutions denoted by "R" may be filled by the two valences of a divalent organic radical; for instance the two radicals indicated by "R" at the 5-position may represent the attachment of a methylene group. Specific exemplary compounds suitable for use in the practice of this invention are 4-methylene-1,3-dioxolane; 4.5-dimethylene-1,3-dioxolane; 2-propyl-4-methylene-1,3-dioxolane; 2-vinyl, 4-methylene-1,3-dioxolane; 2-phenyl, 4-methylene-1,3-dioxolane; and 4-methylene, 5-methyl-1,3-dioxolane.

The methylene dioxolane compounds may be prepared in any suitable manner. One very suitable process comprises the reactions

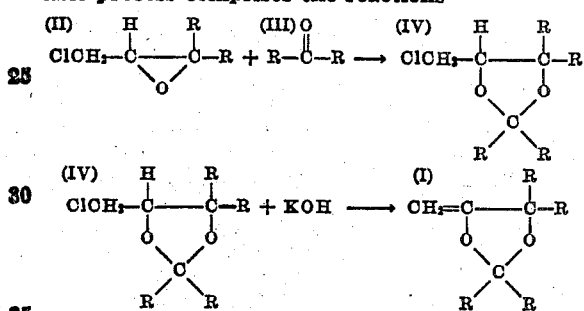

in which "R" follows the notation elaborated upon above. Specific epichlorohydrines of the type of Formula II are exemplified in glycerol epichlorohydrine, 1,4-dichloro-2,3-epoxybutene, butylglycerol epichlorohydrine and the like. The reaction may also be carried out with the use of diols corresponding to the epichlorohydrines, such as glycerine chlorohydrine and butylglycerol chlorohydrine. Likewise the unsaturated compound may be prepared by dehydration of a 4-hydroxymethyl dioxolane instead of dehydrohalogenation of the chloromethyl dioxolane (IV). Suitable aldehydes and ketones for use in the synthesis are exemplified in formaldehyde, acetaldehyde, propionaldehyde, acetone, methyl ethyl ketone, and the like.

It is to be noted that one special advantage of the present invention is the wide range of very simply prepared monomers employed in the manufacture thereof. In the case of the ordinary vinyl esters, halides, nitriles, ethers etc., the configuration of the monomers is pretty well limited by the mode of synthesis; for instance, the manufacture of vinyl and vinylidene chloride monomers does not admit of substitution of the monomeric compound without greatly affecting both the manufacturing process and polymerization behavior of the resulting monomers. Such is not the case with monomers employed in the present invention, which may be prepared from a wide variety of combinations of (a) various cheap glycerine and three- or higher-carbon, petroleum and coal tar derivatives and (b) various aldehydes and ketones, thus enabling the production of resins having properties adjustable to specific applications.

As above noted, the dioxanes of this invention may be polymerized alone, or in combination with other unsaturated compounds of a nature suitable for copolymerization. Compounds which may be copolymerized with methylene dioxolanes according to this invention are illustrated in vinyl compounds on the order of vinyl chloride, vinyl bromide, vinyl fluoride and the like; vinylidene chloride and other vinylidene halides; acrylic-type compounds on the order of acrylonitrile, methyl methacrylate, ethyl acrylate and the like; conjugated polymerizable unsaturated compounds such as butadiene, isoprene, chloroprene, 2,3-dimethyl butadiene-1,3 and the like; and olefinic compounds such as ethylene, isobutylene, propylene, piperylene and the like. Particularly satisfactory products are obtained by the copolymerization of acrylonitrile with dioxolanes according to this invention.

Any of the various means customarily used to effect unsaturated addition polymerizations may be employed to effect the polymerization and copolymerization of 4-methylene dioxolane compounds. Where the dioxolane compounds are polymerized alone, rather energetic means should preferably be used to effect the polymerization, such for instance as the application of Friedel-Crafts-type catalysts on the order of metal halides such as aluminum chloride, zinc chloride, tin chloride, activated clays etc. Copolymerization is effected somewhat more readily, particularly with compounds having an acrylic configuration such as acrylonitrile and acrylic esters. With these compounds, the dioxolanes appear to form "azeotropic" polymers containing approximately equal molar proportions of the dioxolane and the comonomer; almost invariably the copolymers will have a composition nearer to the equi-molecular composition than the mixture of comonomers from which the copolymers were produced. In view of the more ready copolymerization of the dioxolanes, this reaction may be carried out by less vigorous methods than the simple polymerization of the dioxolanes, for instance, by exposure of the mixture of comonomers to ultra-violet light, or by the usual emulsion polymerization techniques employing peroxidic catalysts. In this last case, care must be taken to maintain the aqueous dispersion medium in alkaline condition, as the dioxolanes are very readily hydrolyzed in acid solutions.

The products of this invention vary widely in accordance with the nature of the dioxolane employed, the copolymerized unsaturated compound (if any) employed and the method of polymerization. The simple polymers of the dioxolanes tend to be somewhat soft, and thus find chief use as plasticizing etc. agents for other resins. The copolymers, particularly the copolymers with acrylonitrile in approximately equal molar proportions, are somewhat harder materials and may be used for coating, the production of films, filaments, and the like, and as molding compounds.

With the foregoing general discussion in mind, there are given herewith detailed specific examples of the practice of this invention. All parts given are by weight.

PREPARATION OF 4-METHYLENE-1,3-DIOXOLANE

Preparation of 4-chloromethyl-1,3-dioxolane

|  | Parts |
| --- | --- |
| Epichlorohydrine | 690 |
| Formalin (37%) | 700 |
| Phosphoric acid (85%) | 46 |

The phosphoric acid and formalin were mixed together and heated to 80° C. Thereafter the epichlorohydrine was added in very small portions over a period of one hour to avoid condensation of the epichlorohydrine. The entire mass was refluxed for two hours, and then distilled at atmospheric pressure. The distillate consisted of an aqueous phase and a phase consisting largely of 4-chloromethyl-1,3-dioxolane, which latter phase was dried over sodium sulphate and redistilled. The fraction coming over in the range of 148°–50° C. was taken as a technical grade of 4-chloromethyl-1,3-dioxolane and amounted to 70% of the theoretical amount obtainable.

Dehydrohalogenation of 4-chloromethyl-1,3-dioxolane

|  | Parts |
| --- | --- |
| 4-chloromethyl-1,3-dioxolane | 25 |
| Potassium hydroxide (pellets) | 15 |

The above ingredients were mixed and placed in a reaction vessel provided with a generously proportioned reflux condenser. The mixture was slowly heated to 110° C., whereupon the reaction commenced. The reaction was completed in 3 hours, and the mass distilled. The fraction coming over in the range 90–92° C. was taken as a technical grade of 4-methylene-1,3-dioxolane.

EXAMPLE I

Mass polymerization of 4-methylene-1,3-dioxolane

|  | Parts |
| --- | --- |
| 4-methylene-1,3-dioxolane (prepared as above described) | 100 |
| Catalyst (ZnCl$_2$, SnCl$_4$, AlCl$_3$, CdCl$_2$ or FeCl$_3$) | 2 |

A series of polymerizations was run, using each of the ZnCl$_2$, SnCl$_4$ etc. catalysts set forth above. In each case, the 4-methylene-1,3-dioxolane and selected catalyst were mixed and maintained at room temperature for eighteen hours. The properties of the resultant polymers are tabulated herewith.

Table 1

| Catalyst Used | Description of Polymer Obtained |
| --- | --- |
| ZnCl$_2$ | Clear soft polymer. |
| SnCl$_4$ | Brown rubbery polymer. |
| AlCl$_3$ | Brown soft polymer. |
| CdCl$_2$ | Sticky clear polymer. |
| FeCl$_3$ | Brown sticky polymer. |

EXAMPLE II

Solution polymerization of 4-methylene-1,3-dioxolane

|  | Parts |
| --- | --- |
| 4-methylene-1,3-dioxolane | 100 |
| Solvent (ethylene dichloride, benzene, or butanol) | 200 |
| Catalyst (ZnCl$_2$ or SnCl$_4$) | 2 |

A series of polymerizations was run with the above ingredients, using various combinations of solvents and catalysts listed as indicated in Table II. In each case the selected ingredients were dissolved together and allowed to stand for eighteen hours at 25° C. The solvents and catalysts used, together with the properties of the resultant polymers, are set forth herewith in Table II.

Table II

| Solvent | Catalyst | Description of Polymer |
|---|---|---|
| EtCl₂ | ZnCl₂ | Soft clear polymer. |
| Do | SnCl₄ | Brown soft polymer. |
| Benzene | do | Brown rubbery polymer. |
| Butanol | do | Clear viscous liquid polymer. |

EXAMPLE III

*Mass copolymerization of 4-methylene-1,3-dioxolane and acrylonitrile*

| | Parts |
|---|---|
| 4-methylene-1,3-dioxolane | 100 |
| Acrylonitrile | 100 |
| Benzoyl peroxide | 3 |

The above ingredients were dissolved together and kept at 60° C. for eighteen hours. The resultant clear, hard, thermoplastic, colorless copolymer was soluble in ethylene dichloride and was suitable as a molding compound, a constituent of coating compositions, and the like.

EXAMPLE IV

*Mass heat-copolymerization of 4-methylene dioxolane and acrylonitrile*

| | Parts |
|---|---|
| 4-methylene-1,3-dioxolane | 1, 2, 3 or 4 |
| Acrylonitrile (correspondingly) | 4, 3, 2 or 1 |

A series of copolymerizations was run using the 4-methylene-1,3-dioxolane and acrylonitrile in the proportions listed above. In each case, the mixture of monomers was placed in a sealed bottle and maintained at 60° C. for twenty-four hours. Polymers were obtained in each case, the most satisfactory of which appeared to be the copolymer produced from two parts of acrylonitrile and three parts of 4-methylene-1,3-dioxolane. This particular copolymer was readily soluble in nitromethane and cyclohexanone. This product was characterized by the same excellent properties, and susceptible to the same uses as the copolymer of Example III.

EXAMPLE V

*Mass copolymerization by ultra-violet*

| | Parts |
|---|---|
| 4-methylene-1,3-dioxolane | 10 |
| Methyl methacrylate or acrylonitrile | 10 |

The two mixtures were prepared in accordance with the foregoing schedule, one mixture containing methyl methacrylate and the other acrylonitrile. These mixtures were placed in Pyrex glass vessels and exposed to ultra-violet light for twenty-four hours. The resultant polymers had the same excellent properties characterizing the products of Examples III and IV.

EXAMPLE VI

*Emulsion copolymerization of 4-methylene-1,3-dioxolane*

| | Parts |
|---|---|
| 4-methylene-1,3-dioxolane | 100 |
| Acrylonitrile, methyl methacrylate, or ethyl acrylate | 60 |
| Water | 600 |
| Aquarex D (a sodium alkyl sulfate manufactured by E. I. du Pont de Nemours & Co.) | 3 |
| Ammonium persulfate | 1 |
| Sodium bicarbonate | 2 |

A series of copolymerizations was run, using the above ingredients with acrylonitrile, methyl methacrylate, and ethyl acrylate in the respective separate copolymerizations. In each case, the selected ingredients were mixed, placed in a glass vessel and the air in the vessel swept out by nitrogen. The vessel was then sealed up and placed in an apparatus which repeatedly revolved the vessel and dipped it in a water bath maintained at 60° C. At the end of eighteen hours, the vessels were opened, the mass coagulated by addition of methanol, and the resultant resin filtered and washed. The acrylonitrile and methyl methacrylate copolymers were quite hard resins melting at about 90° C. and suitable as coating agents, molding compounds, extrusion as filaments, etc. The acrylonitrile copolymer was extruded at 90° C. in a laboratory extruder to form a filament 0.1" in diameter having a tensile strength of 13,000 pounds per square inch.

EXAMPLE VII

*Copolymer of 2-propyl-4-methylene-1,3-dioxolane with acrylonitrile*

| | Parts |
|---|---|
| 2-propyl-4-methylene-1,3-dioxolane [1] | 100 |
| Acrylonitrile | 25 |
| Water | 600 |
| Aquarex D | 3 |
| Ammonium persulfate | 1 |
| Sodium bicarbonate | 2 |

[1] Prepared similarly to 4-methylene-1,3-dioxolane as above described, except that butyraldehyde was employed in place of the Formalin.

The above ingredients were mixed and placed in a glass vessel, and the air swept out of the vessel by means of nitrogen. The vessel was then sealed up and placed in an apparatus which repeatedly revolved the vessel and dipped it into a water bath maintained at 60° C. At the end of eighteen hours, the vessel was opened, the mass coagulated by addition of methanol. The sticky coagulum was then triturated with water, thereby removing the methanol and unpolymerized material, leaving a resin which softened at about 80° C.

PREPARATION OF 4,5-METHYLENE-1,3-DIOXOLANE

*Preparation of 1,4-dichlorobutanediol-2,3*

| | Parts |
|---|---|
| 1,4-dichlorobutene-2 | 20 |
| Acetone | 1200 |
| Potassium permanganate solution (aqueous solution containing 4% KMnO₄) | 750 |

The 1,4-dichlorobutene-2 and acetone were mixed, cooled to −35° C. and placed in a vessel provided with ample refluxing means and a stirring device. The permanganate solution was added gradually over a period of four hours with vigorous stirring. The mass was then filtered to remove the manganese dioxide, evaporated down to about 300 parts, and extracted with ethyl ether. The ether extract was evaporated and cooled to crystallize crude 1,4-dichlorobutanediol-2,3. The crude product was recrystallized from heptane to yield a product melting at 61–62° C.

*Preparation of 4,5-di(chloromethyl)-1,3-dioxolane*

| | Parts |
|---|---|
| 1,4-dichlorobutanediol-2,3 (prepared as just described) | 30 |
| Formalin | 50 |
| Phosphoric acid (85%) | 9 |

The above ingredients were reacted together at 120° C. for three hours. The mass was then subjected to vacuum distillation to remove the water. The residue was then further vacuum distilled, the product coming over at 102° C. under 17 mm. pressure being taken as a technical grade of 4,5-di(chloromethyl)-1,3-dioxolane.

Dehydrohalogenation of 4,5(chloromethyl)-1,3-dioxolane

| | Parts |
|---|---|
| 4,5-di(chloromethyl)-1,3-dioxolane (prepared as just described) | 22 |
| Potassium hydroxide (pellets) | 30 |

The above ingredients were reacted together similarly as described for the dehydrohalogenation of 4-chloromethyl-1,3-dioxolane above. The fraction coming over in the range 115–116° C. was taken as a substantially pure 4,5-dimethylene-1,3-dioxolane.

EXAMPLE VIII

*Copolymerization of 4,5-dimethylene-1,3-dioxolane with acrylonitrile*

| | Parts |
|---|---|
| 4,5-dimethylene-1,3-dioxolane | 2 |
| Acrylonitrile | 2 |

The above ingredients were mixed and exposed in a Pyrex vessel to an ultra-violet lamp for eighteen hours. The product was a hard resin.

EXAMPLE IX

*Polymerization of 4,5-dimethylene-1,3-dioxolane*

A sample of 4,5-dimethylene-1,3-dioxolane was exposed in a Pyrex vessel to ultra-violet light for four hours, and was thereby converted to a hard resin.

EXAMPLE X

*Copolymerization of 4-methylene-1,3-dioxolane with vinylidene chloride*

| | Parts |
|---|---|
| 4-methylene-1,3-dioxolane | 1 |
| Vinylidene chloride | 1 |

The above ingredients were mixed and exposed in a Pyrex vessel to an ultra-violet light for fifty hours. The product was a soft resin.

From the foregoing general discussion and detailed specific examples it will be evident that the applicants' invention provides a new class of synthetic polymeric resins suitable for a wide variety of purposes such as thermoplastic molding compounds, both injection and compression; extrusion compounds for the manufacture of filaments, architectural and like sections, tubing, etc.; coatings for fabrics, paper, leather etc.; the manufacture of flexible transparent and non-transparent films for packaging, rainwear, draperies, etc.; as adhesives; as safety glass interlayers; and as blending and plasticizing agents for other synthetic resins. The products require as starting materials only the readily and cheaply procurable (A) glycerol chlorohydrine derivatives, and (B) aldehydes or ketones. The properties of the resins may be readily adjusted for particular applications by the use of dioxolanes derived from various different glycerine chlorohydrine derivatives, and from various aldehydes and ketones.

What is claimed is:

1. A substance selected from the group consisting of (1) resinous homopolymers of dimethylene dioxolanes having the formula:

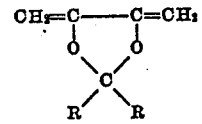

in which formula "R," independently in each occurrence, is a substituent selected from the group consisting of hydrogen and methyl, ethyl, propyl, butyl, phenyl, benzyl, and tolyl groups, (2) resinous copolymers of said dimethylene dioxolanes with equal proportions of acrylonitrile and (3) resinous copolymers of said dimethylene dioxolanes with equal proportions of vinylidene chloride.

2. A resinous homopolymer of 4,5-dimethylene-1,3-dioxolane.

3. A resinous copolymer of 4,5-dimethylene-1,3-dioxolane with equal proportions of acrylonitrile.

4. A resinous copolymer of 4,5-dimethylene-1,3-dioxolane with equal proportions of vinylidene chloride.

MILTON R. RADCLIFFE.
WILLIAM G. MAYES.

REFERENCES CITED

The following references are of record in the file of this patent:

UNITED STATES PATENTS

| Number | Name | Date |
|---|---|---|
| 2,382,640 | Kenyon et al. | Aug. 14, 1945 |
| 2,394,862 | Loder et al. | Feb. 12, 1946 |